United States Patent Office 2,797,184
Patented June 25, 1957

---

2,797,184

PROCESS FOR THE RECOVERY OF HEPARIN

Lester L. Coleman and Lucian Bayard Spaulding, Kalamazoo, Mich., assignors to The Upjohn Company, Kalamazoo, Mich., a corporation of Michigan No Drawing. Application July 1, 1953,
Serial No. 365,551

8 Claims. (Cl. 167—74)

The present invention relates to a novel process for the recovery of heparin from a heparin-protein mixture and is more particularly concerned with a novel process for the recovery of heparin from a heparin-protein mixture obtained by the extraction of animal tissues.

In the recovery of heparin from animal tissues, such as beef or pork lung, liver, and muscle, the procedure is based upon work done by Charles and Scott [J. Biol. Chem. 102, 425 (1933) and upon the process described by them in Roy. Soc. Can. Trans. 28, Sec. 5, 55–58 (1934)]. The procedure ordinarily involves the autolysis of the animal tissues involved, generally in the presence of added water and at an elevated temperature, alkaline extraction of the autolyzed mixture, usually completed with ammonium sulfate and sodium hydroxide, heating of the resulting mixture to approximately eighty degrees centigrade and thereupon filtering to remove the coagulated substance. The resulting filtrate upon acidification produces a precipitate of a protetin-heparin complex which, according to the above mentioned process, is subjected to the action of a proteolytic enzyme, e. g., trypsin, thus effecting an enzymatic digestion of the denatured protein material contained in the complex. A subsequent treatment of the digestion mixture with an alcohol or acetone precipitates the desired heparin in a crude form.

The foregoing method, of necessity, requires a lengthy enzymatic digestion period, approximately 72 hours in most instances, to effectively destroy the protein-heparin complex. Furthermore the desirable heparin, upon precipitation with an alcohol or acetone, subsequent to the enzymatic digestion, contains therein the protetin hydrolytic end products, resulting in a heparin product of relatively low activity.

It has been proposed (U. S. Patent No. 2,623,001, issued December 23, 1952) to extract heparin under mild conditions (without autolysis, alkaline extraction, or heat) so as to avoid denaturing the protein and to recover heparin from the obtained water-soluble heparin-protein complex by adding a soluble salt to saturate the complex solution, while maintaining the pH between 6.5 and 10.0, to precipitate the protein and recovering the heparin from the solution. The patentee, however, points out that his process does not work with denatured protein and that in the procedure outlined by Charles et al. [J. Biol. Chem. 102, 425 (1933)], the heparin bound protein can only be freed by digestion with trypsin.

It is an object of the present invention to provide an improved process for the recovery of heparin from a heparin-protein mixture resulting from autolysis and alkaline extraction of heparin-bearing tissue. It is a further object of the present invention to provide a process for the preparation of heparin which eliminates the enzymatic digestion customarily employed for protein removal. Another object of the present invention is to provide a process for the preparation of heparin which reduces the time involved in the liberation of heparin from animal tissues. It is also an object of the present invention to provide a process which produces a purer heparin having a higher anticoagulant activity in terms of assay units per milligram than is generally obtained by the enzymatic digestion process.

It has now been found that heparin can be freed from its protetin-heparin mixture by adding a suitable salt to the aqueous alkaline solution of the protein-heparin mixture, acidifying the alkaline salt solution thus obtained to precipitate the protein, removing the precipitate, and recovering the desired heparin from the filtrate.

While as already noted it has been proposed to precipitate protein from a water solution of a heparin-protein complex by saturating the solution with a salt, such a process is not operative where the protein is denatured as, for example, by autolysis, alkaline extraction, or heat. Furthermore in such a process the salt is the protein precipitant, whereas in the process of the invention the acid is the protein precipitant and the salt apparently acts only to prevent association of the protein and heparin in the precipitate. The process of the present invention, however, is applicable to either denatured or native proteins so that rigid control of the initial tissue extraction need not be maintained to prohibit denaturation.

Although the precipitation mechanism is not thoroughly understood, it is believed that the negative ion of the salt employed combines with the undesirable protein material therein so that upon the subsequent acidification of the mixture the protein precipitates free of the heparin. It is thus possible by the process of the invention to eliminate the enzymatic digestion procedure heretofore necessary in the prior art procedure. It is also possible by the process of the invention to effect further refining of heparin where for one reason or another it is contaminated with proteins, especialy denatured proteins. Additionally it is possible through the invention to recover high-grade heparin by relatively simple treatment of the filtrate as will be more particularly pointed out.

In carrying out the present invention, according to one procedure, the acid precipitated protein-heparin complex, produced by conventional procedure, as illustratively discussed above, is dissolved in water maintained at a pH of at least 7, advantageously at an alkaline pH of 8 to 10, inclusive. A salt is dissolved in the mixture, the resulting salt mixture is acidified and centrifuged, or otherwise filtered, to remove the precipitated protein, whereupon partially purified heparin is recovered from the filtrate through the addition of alcohol, acetone, or the like. Salts operating most satisfactorily are those which are water-soluble, dissociated, and which do not react with other components of the system to form precipitates which would remove the salts from solution or remove heparin from solution. Representative salts which can effectively be utilized include the alkali-metal (including ammonium) citrates, halides, acetates, sulfates or thiocyanates or alkaline-earth halides, acetates, or citrates.

Salt concentrations found to be most effective in the process should be sufficient to provide an anion concentration from between about one mole and about saturation per liter of mixture, e. g., at least one mole of sodium chloride, at least one mole of sodium thiocyanate, at least one mole of sodium sulfate, or at least one-half mole of calcium chloride. The preferred salt employed in the process of the present invention is sodium chloride and at an anion concentration from at least about sixty grams per liter, preferably from about 100 to about 150 grams per liter. If in the process of the invention native or undenatured proteins are bound to the heparin, the use of a concentrated salt solution may precipitate a portion of the protein, especially at low temperatures. However, subsequent acidification results in a more complete removal of the undesirable protein and correspondingly effects a greater yield of valuable heparin.

The temperature at which the protein coagulation is effected is advantageously maintained between about twenty and about sixty degrees centigrade. Lower temperatures down to about zero degrees centigrade and higher temperatures up to about 100 degrees centigrade can be used, however, if desired. Heating during or after the acidification is useful in coagulating the protein.

The precipitation of the protein is effected by adding any strong acids such as sulfuric acid, hydrochloric acid, trichloroacetic acid or the like. Any acid of sufficient strength to lower the pH enough to effect coagulation of the protein may be used. The pH necessary for this purpose ordinarily lies below pH 4, advantageously about pH 2.5.

After the precipitated protein is filtered off, using a centrifuge or other type of filter, the filtrate is treated to recover the heparin. Ordinarily this is done by adding methyl or ethyl alcohol, acetone, or other water miscible organic solvent to precipitate the heparin. In the instances where the salt, e. g., sodium sulfate, is not very soluble in ethyl alcohol or acetone, it is desirable in order to avoid contamination of the precipitated heparin with the salt to subject the filtrate to dialysis to remove the undesirable salt before the heparin is precipitated. Alternatively, the precipitated heparin containing the salt impurity can be purified by dissolving the impure heparin in water, dialyzing the solution to remove the undesirable salt, and reprecipitating the heparin to a greater degree of purity with alcohol or acetone as described above.

In the process of the present invention the selected salt can also be added to the original alkaline extract of the tissue in which case the protein contained therein precipitates after the initial acidification. The protein can then be removed by filtration and the heparin precipitated from the filtrate by the addition of alcohol or acetone as discussed above.

The process of the present invention can also be employed for the further purification of impure heparin. For example, impure heparin can be mixed with any acid precipitable protein, such as, casein, the mixture acidified, whereupon the resulting heparin-protein complex precipitate can be reacted upon as discussed above to produce a more purified heparin product.

The following examples in which the parts are by weight unless otherwise specified will serve to illustrate the process and products of this invention, but the said invention is not to be considered as limited thereto.

*Example 1*

One hundred parts by weight of ground beef lung were mixed with an equal weight of water and allowed to stand at 37 degrees centigrade for twenty hours, whereafter ten parts of ammonium sulfate and three parts of sodium hydroxide were added in 45 parts by weight of water. The mixture was then stirred and heated for one hour at 45 degrees centigrade, heated to eighty degrees centigrade, and the precipitate removed by filtration. The resulting alkaline filtrate containing heparin was treated with sulfuric acid until the pH reached 2.5, and thereafter heated to 65 degrees centigrade for fifteen minutes. The resulting heparin-protein complex precipitate was separated by centrifugation, washed with alcohol, redissolved in twenty parts by weight of water at pH 10 and ten parts by weight of sodium chloride were added to each 100 parts by weight of alkaline solution. The resulting alkaline solution salt mixture was acidified with sulfuric acid to pH 2.5, and the resulting protein precipitate separated by centrifugation. After adjusting the pH of the supernatant to 5.5, two volumes of ethyl alcohol were added, and the heparin precipitate separated by centrifugation, washed with acetone and dried. The yield was .026 part by weight of heparin assaying 93 U. S. P. units per milligram.

*Example 2*

Eighteen parts by weight of sodium chloride were dissolved in 100 parts by weight of alkaline extract prepared from 33⅓ parts of beef lung as described in Example 1. Sulfuric acid was then added to the mixture until the pH reached 2.5, the acidified mixture heated to 65 degrees centigrade for fifteen minutes, and the resulting precipitate removed by centrifugation. The supernatant was adjusted to pH 8.5 and dialyzed against distilled water until the chloride concentration was below two percent. The dialyzed solution was concentrated to its pre-dialysis volume and mixed with two volumes of methanol. The precipitated heparin was separated by centrifugation, washed with acetone and dried under reduced pressure at 65 degrees centigrade. The yield was 0.1 parts by weight of crude heparin assaying 11.5 U. S. P. units per milligram.

*Example 3*

To the alkaline extract, prepared from 100 parts by weight of beef lung as given in Example 1, was added concentrated hydrochloric acid to adjust the pH of the mixture to 1.0. The resulting precipitate was separated by filtration, washed with acidified water, and extracted twice with ethyl alcohol. The residual alcohol was evaporated, the resulting material dissolved in 100 parts by weight of water maintained at pH 8.5 by means of sodium hydroxide, and to this solution was added 12.6 parts by weight of sodium thiocyanate. When the latter had dissolved, the pH of the solution was adjusted to pH 2.5 with trichloroacetic acid, and the resulting protein precipitate was removed by centrifugation. The supernatant was dialyzed against distilled water, concentrated to its pre-dialysis volume, and the heparin precipitated by adding two volumes of methanol. The precipitated heparin was separated by filtration and washed with 75 percent methanol. The heparin precipitate was further washed with acetone and dried under reduced pressure at 75 degrees centigrade. The yield was 0.28 parts by weight having an activity of 68 U. S. P. heparin units per milligram.

*Example 4*

To one thousand parts by weight of an alkaline solution of heparin and protein, at a pH of 8.4, prepared from 10,000 parts by weight of beef lung according to the procedure given in Example 1, was added 301 parts by weight of calcium acetate. When the calcium acetate was completely dissolved, the pH of the solution was lowered to 2.5 with hydrochloric acid. The resulting precipitate was separated by filtration and the pH of the filtrate raised to 5.5 with sodium hydroxide, whereupon heparin was precipitated from the filtrate by the addition of two volumes of ethanol. The precipitated heparin, after allowing the mixture to stand for several hours, was separated by decantation and washed with 67 percent ethanol. The heparin precipitate was further washed with acetone and dried under reduced pressure at 65 degrees centigrade. The yield was 3.2 parts by weight of heparin having an activity of 45.3 U. S. P. heparin units per milligram.

*Example 5*

To two hundred parts by weight of an alkaline solution of the heparin and protein, at a pH of 7.5, prepared from 2,000 parts by weight of beef lung according to the procedure given in Example 1, was added 45 parts by weight of powdered ammonium sulfate. When the ammonium sulfate was completely dissolved, the pH was lowered to 2.5 by the addition of hydrochloric acid, and the resulting precipitate removed by centrifugation. The supernatant containing the heparin was adjusted to pH 5.5 with sodium hydroxide, two volumes of ethanol were added, the resulting precipitate was allowed to settle, and the clear supernatant liquid was decanted and discarded. The precipitate was further washed once with 67 percent ethanol and several times with acetone. The heparin precipitate was dried under reduced pressure at sixty degrees centigrade, and 41 parts by weight of crude heparin assaying 0.62 U. S. P. unit per milligram were obtained. The crude heparin was purified by the removal of ammonium sulfate (precipitated along with the heparin by the addition of ethanol) by dissolving the crude heparin in water and dialyzing the solution, thus reducing the sulfate concentration to less than one percent, whereafter the addition of two volumes of ethanol to the aqueous mixture precipitated the heparin. The heparin precipitate was further washed with 67 percent ethanol and again with acetone and finally dried. The resulting heparin was obtained in 94 percent yields from the crude, and had an activity of 104 U. S. P. heparin units per milligram.

*Example 6*

To one hundred parts by weight of an alkaline solution of heparin and protein, prepared from 1000 parts by weight of beef lung according to the procedure given in Example 1, was added 41.5 parts by weight of ammonium citrate at a pH of 8.4. When the ammonium citrate was completely dissolved, the pH was lowered to 2.5 by the addition of hydrochloric acid. The resulting precipitate was removed by centrifugation. The supernatant containing the heparin was adjusted to pH 8.0 and dialyzed against distilled water for 24 hours. The dialyzed solution was concentrated under reduced pressure to predialysis volume, the pH of the mixture adjusted to 5.5, two volumes of ethanol added thereto, and the resulting heparin precipitate separated by centrifugation and washed with 67 percent ethanol and with acetone. After drying under reduced pressure at 55 degrees centigrade, 0.22 part of heparin was obtained assaying 66 U. S. P. heparin units per milligram.

It is to be understood that this invention is not to be limited to the exact details of operation or exact compounds shown and described, as obvious modifications and equivalents will be apparent to one skilled in the art and the invention is therefore to be limited only by the scope of the appended claims.

We claim:

1. In a process for the recovery of heparin, the steps of preparing an aqueous solution of a protein-heparin mixture having a pH of at least seven, adding sufficient soluble salt to said solution to produce an anion concentration of between about one mole and about saturation per liter, acidifying the salt containing solution to a pH of less than 4.0 to precipitate the protein, and recovering heparin from the remaining solution.

2. In a process for the recovery of heparin, the steps of preparing an aqueous solution of a protein-heparin mixture having a pH of between about seven and about ten, adding sufficient soluble salt to said solution to produce an anion concentration of between about one mole and about saturation per liter, acidifying the salt containing solution to a pH of less than 4.0 to precipitate the protein, and recovering heparin from the remaining solution.

3. In a process for the recovery of heparin, the steps of preparing an aqueous solution of a protein-heparin mixture having a pH of between about seven and about ten, adding sodium chloride to said solution to produce an anion concentration of between about one mole and about saturation per liter, acidifying said mixture to a pH of less than 4 to precipitate the protein, and recovering heparin from the remaining solution.

4. In a process for the recovery of heparin, the steps of preparing an aqueous solution of a protein-heparin mixture having a pH of between about seven and about ten, adding between about 100 grams and about 150 grams of sodium chloride per liter, acidifying the salt containing solution to a pH of about 2.5 to precipitate the protein, and recovering heparin from the filtrate.

5. In a process for the recovery of heparin, the steps of autolyzing animal tissue, extracting the autolyzed tissue with an aqueous solution of alkali, heating the mixture, filtering to remove the coagulated substance, acidifying the filtrate to produce a protein-heparin complex, dissolving the complex in water maintained at a pH of at least seven to prepare an aqueous protein-heparin solution, adding sufficient soluble salt to the solution to produce an anion concentration of between about one mole and about saturation per liter, acidifying said salt containing solution to a pH of less than 4.0 to precipitate the protein, and recovering heparin from the remaining solution.

6. The process of claim 5 wherein the aqueous solution of alkali utilized to extract the autolyzed tissue contains ammonium sulfate.

7. In a process for the recovery of heparin, the steps of autolyzing animal tissue, extracting the autolyzed tissue with an aqueous solution of alkali, heating the mixture, filtering to remove the coagulated substance, acidifying the filtrate to produce a protein-heparin complex, dissolving the complex in water maintained at a pH of between about seven and about ten to prepare an aqueous protein-heparin solution, adding to the solution between about 100 grams and about 150 grams of sodium chloride per liter of solution, acidifying said salt containing solution to a pH of less than 4 to precipitate the protein, and recovering heparin from the filtrate.

8. In a process for the recovery of heparin, the steps of autolyzing animal tissue, extracting the autolyzed tissue with an aqueous solution of alkali, heating the mixture, filtering to remove the coagulated substance, acidifying the filtrate to produce a protein-heparin complex, dissolving the complex in water maintained at a pH of about eight to prepare an aqueous protein-heparin solution, adding to the solution about 100 grams of sodium chloride per liter of solution, acidifying the salt containing solution to a pH of about 2.5 to precipitate the protein, and recovering heparin from the filtrate.

References Cited in the file of this patent

UNITED STATES PATENTS

| | | |
|---|---|---|
| 2,410,084 | Kuizenga | Oct. 29, 1946 |
| 2,623,001 | Sylven | Dec. 23, 1952 |

OTHER REFERENCES

Charles et al.: J. Biol. Chem., vol. 102, 1933, pages 425 to 448 (particularly page 438).

Suto-Nagy: J. Biol. Chem., Dec. 1944, pages 433 to 441 (particularly 433, 435 and 436).

Greenberg: Amino Acids and Proteins, 1951, C. C. Thomas, Springfield, Ill., pages 286 and 287.